(No Model.)

J. H. CARRINGTON.
MECHANICAL MOVEMENT.

No. 311,643. Patented Feb. 3, 1885.

WITNESSES:
C. Neveux
C. Sedgwick

INVENTOR:
J. H. Carrington
BY Munn & Co
ATTORNEYS.

UNITED STATES PATENT OFFICE.

JAMES H. CARRINGTON, OF NEW YORK, N. Y.

MECHANICAL MOVEMENT.

SPECIFICATION forming part of Letters Patent No. 311,643, dated February 3, 1885.

Application filed June 24, 1884. (No model.)

*To all whom it may concern:*

Be it known that I, JAMES H. CARRINGTON, of the city, county, and State of New York, have invented a new and Improved Mechanical Movement, of which the following is a full, clear, and exact description.

Reference is to be had to the accompanying drawings, forming part of this specification, in which similar letters of reference indicate corresponding parts in both the figures.

Figure 1:
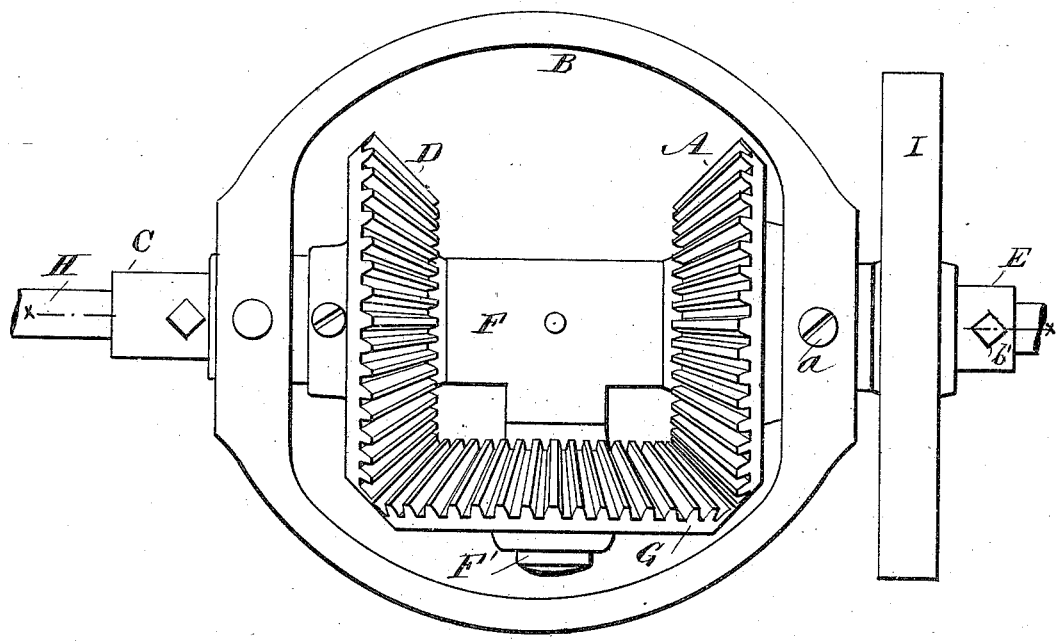
Figure 2:
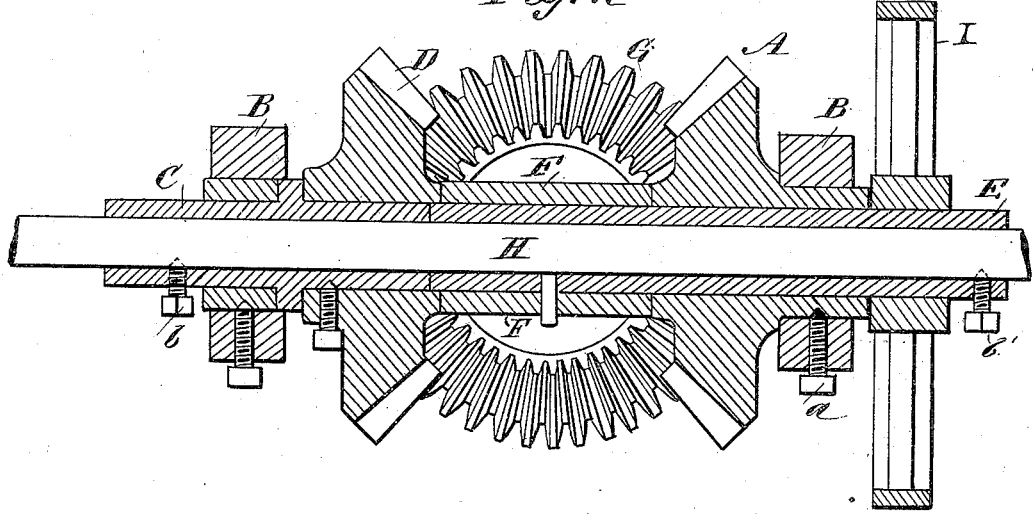

Figure 1 is a plan view of my new and improved mechanical movement, and Fig. 2 is a sectional elevation of the same, taken on the line $x$ $x$ of Fig. 1.

This invention relates to certain improvements in that class of mechanical movements shown and described in Letters Patent No. 57,693, dated September 4, 1866; and it consists, principally, in the employment of an axial shaft for the transmission of fast or slow motion.

The invention also consists of the construction, arrangement, and combination of parts, as hereinafter described and claimed.

Referring to the drawings, the beveled gear A has a central passage through it, and is relatively fixed in one side of the frame B by the set-screw $a$. Journaled in the other side of the frame B is the collared sleeve C. On this sleeve C is secured the beveled gear D, which faces the gear-wheel A.

Passing loosely through the gear-wheel A is the hollow shaft E, which terminates at the inner end of the sleeve C, and reaches beyond or out from the frame B.

On the hollow shaft E, between the beveled gears A D, is fixed the sleeve F, upon the gudgeon F' of which is journaled the beveled gear G, which meshes with both the gears A D, and through the hollow shaft E and sleeve C is passed the main shaft H, to which either the sleeve C or hollow shaft E may be secured by the set-screws $b$ $b'$, or by other suitable means, so that power applied to the hollow shaft E by the band-wheel I, secured thereto, or by other means, the shaft H will be revolved in both cases, but with different speeds—that is to say, the set-screw $b$ being loosened, and the screw $b'$ set down upon the shaft H, the latter will have a slow motion, revolving at the same speed with the hollow shaft E, sleeve F, and intermediate gear-wheel, G, the two latter parts in this arrangement being of no practical service; but by loosening the screw $b'$ and tightening the screw $b$ upon the shaft H this shaft will take its motion from the sleeve C, which, owing to the action of the gear-wheels A D G. has twice the speed of the hollow shaft E, thus doubling the speed of the shaft H.

In this manner a rapid motion may be transmitted by the shaft H, and a slow motion at the same time transmitted by the hollow shaft E with one and the same attachment or application of the motive power.

It will be understood that the sleeve F and gear-wheel G always revolve with the hollow shaft E around the common axis of the said gear-wheels A D, and that this motion (the wheel A being relatively stationary) causes the wheel G to revolve upon the gudgeon F', which motion transmits a multiplied speed to the wheel D and sleeve C; and it will be understood, also, that the relative speed of latter with that of the shaft E may be varied by varying the relative sizes of the gear-wheels A D G.

Having thus described my invention, what I claim as new, and desire to secure by Letters Patent, is—

The hollow shaft E and sleeves C and F, the latter carrying the intermediate gear, G, combined with the axial shaft H and the gear-wheels A and D, arranged to operate substantially as described.

JAMES H. CARRINGTON.

Witnesses:
D. F. CAMERON,
A. H. GLEASON.